Sept. 14, 1965     R. L. FERRELL     3,206,703
MINIATURE ROTARY ELECTRIC COMPONENT Filed March 19, 1963     3 Sheets-Sheet 1

ROBERT L. FERRELL
INVENTOR.

BY Nilsson & Robbins

ATTORNEYS

Sept. 14, 1965 R. L. FERRELL 3,206,703
MINIATURE ROTARY ELECTRIC COMPONENT
Filed March 19, 1963 3 Sheets-Sheet 3

ROBERT L. FERRELL
INVENTOR.

BY
Nilsson & Robbins
ATTORNEYS

United States Patent Office 3,206,703
Patented Sept. 14, 1965

3,206,703
MINIATURE ROTARY ELECTRIC COMPONENT
Robert L. Ferrell, Riverside, Calif., assignor to Spectrol
Electronics Corporation, San Gabriel, Calif., a corporation of Delaware
Filed Mar. 19, 1963, Ser. No. 266,309
3 Claims. (Cl. 338—166)

This invention relates generally to the transmission of action between rotating bodies in what may be different from a one to one aspect. More particularly the invention relates in many of its structural embodiments to devices for controlling the relative angular velocities of tuning dials, potentiometers, and the like.

It is often desirable to couple rotationally the armature of a potentiometer, a tuning component, a servomotor, or the like, to a control shaft or indicator dial whereby the latter is "geared down" or "geared up" with respect to the former. Such a device may function in the nature of a vernier or as an angular velocity or torque reverser or multiplier.

In a tuning capacitor of a radio signal receiver, for example, the entire range of adjustment and thereby the frequency band may be covered in only one half or less of a revolution of the capacitor rotor. For precision adjustment with a tuning knob and for accurate indication of the angular disposition of the capacitor rotor, it is frequently mandatory that a coupling be provided between the rotor and the knob whereby their turns ratio or angular velocities are significantly different from one to one in order to gear down the action of the capacitor rotor with respect to the knob rotation. Typically such turning ratios are provided by gear trains or belts or pulleys. However, such approaches suffer the general disadvantages of being complex, costly and too bulky for use in miniaturized systems; and when these characteristics are proved, it has in the past been at the expense of the mechanical reliability of the device.

It is therefore an object of the present invention to provide a method and device for achieving rotary coupling between bodies whereby their relative angular velocity is a predetermined arbitrary value.

It is another object to provide a device for achieving such rotary coupling which device is not subject to the above discussed and other disadvantages of the prior art.

It is another object to provide such a device which may be extremely compact and mechanically reliable and durable and which may be readily mass produced.

It is another object of the invention to provide a highly miniaturized, multi-turn potentiometer.

It is another object to provide such a miniature potentiometer which may be constructed to achieve high turns ratio in either a positive or negative sense with respect to that of the control knob.

It is another object to provide rotary coupling without the employment of gears or belts or pulleys in the usual sense of these terms.

Briefly, these and other objects are achieved in accordance with a structural example of the invention in which a knurled central shaft having a radius of approximately two millimeters is rotationally coaxially supported along a given axis. A radial extending arm affixed to the shaft may serve as a dial indicator or a potentiometer rotary wiper arm. A deformable Teflon sleeve having an inner radius of approximately 2.2 millimeters is placed over the central shaft and is secured to a frame or housing member to prevent any rotational movement of the Teflon while permitting it to be flexed radially inwardly or outwardly. It may be noted that the sleeve is over-size with respect to the central shaft; the ratios of diameters, or circumferences, being 1.1 to 1.

Next, an internally slotted knob member is placed over the Teflon sleeve in a manner to press the latter into contact with the central shaft at two diametrically opposed points thereon. The radially inwardly directed force on the Teflon by the slotted knob member is sufficient to ensure that there will be no slippage between the inner surface of the Teflon and the knurled central shaft. The slotted knob member however is smooth and relatively free to slide around the outer periphery of the Teflon sleeve in spite of the radial forces exerted on the Teflon by the slotted knob member.

In operation when the slotted knob is rotated as by the operator or technician, the points of contact between the Teflon and the inner shaft are seen to rotate correspondingly.

The inner shaft however is observed to rotate in the opposite sense of rotation at an angular velocity of, in this example, approximately one tenth that of the knob member. Thus as the knob is rotated ten turns clockwise, the inner central shaft rotates one turn counterclockwise.

A discussion of the mechanics involved and a mathematical specification thereof will be discussed in more detail below. In addition further details of these and other novel features and their principles of operation as well as additional objects and advantages of the invention will become apparent and be best understood from a consideration of the following description taken in connection with the accompanying drawings which are presented by way of illustrative example only and in which.

Referring to the figures in more detail it is stressed that the details shown are by way of example and illustrative discussion only and are presented in the cause of providing what is believed to be the most useful and readily understood description of the principles and structural concepts of the invention. Specifically the detailed showing is not intended to be taken as a limitation upon the scope of the invention which is defined by the appended claims forming, along with the drawings, a part of this specification.

Figure 1:
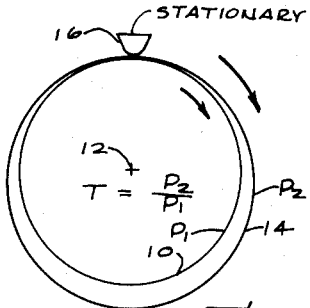
FIG. 1 and FIG. 2 and FIG. 3 are diagrammatic illustrations useful in discussing the operation of a rotary control method and system in accordance with the principles of the present invention.

In FIG. 1 a schematic three-element rotary system is shown including an inner circular member 10 having a center of rotation 12 and a circular outer perimeter of length $P_1$. The second element is in this example a flexible, continuous strip member 14 having an inner periphery of length $P_2$. The third element is a sliding pressure member 16 which is adapted to cause a non-slipping contact between the first two elements; members 10, 14, while itself sliding freely with respect to the outer surface of the member 14.

In observing the relative rotary action between these three elements in FIG. 1 the frame of reference of the pressure member 16 is taken for the observer; that is, the observer is presumed to be at rest on the sliding pressure member 16, with the inner two members 10, 14 rotating and moving past him. In this frame of reference it is elementary that the ratio of revolution or turns T between the member 14 and the member 10 is simply the ratio $P_2/P_1$ of their circumferences or perimeters. Thus if the movable members 10, 14 are rotated clockwise as indicated by the arrows in the figure and if $P_2$ is ten percent longer than $P_1$ the larger member will rotate ten percent more slowly than the smaller, and T would be 1.1.

Figure 2:
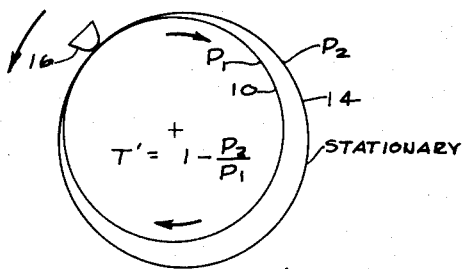

In FIG. 2 the same system is examined in a different frame of reference, viz. that of the member 14. In this frame of reference the member 14 is taken as stationary for the observer with the pressure member 16 rotating counterclockwise with respect thereto. Note that the relative motion is the same as before, i.e., the member 14 is still rotating clockwise with respect to the sliding pressure member 16; and the inner smaller member 10 is still rotating clockwise with respect to the outer member 14.

In this view it is convenient to consider the sliding pressure member 16 as simply a non-structural moving point of tangency between the other curved surfaces. In this manner the motion may readily be seen to be the same as that of a ball rolling, without slippage, around the inner periphery of a larger hollow cylinder, where the observer is at rest with respect to the larger cylinder. In this frame of reference it is readily apparent that the point of tangency (member 16) moves in a counterclockwise sense of rotation as the inner ball (member 10) rolls around the cylinder (member 14) while the ball itself is rotating clockwise.

The turns ratio $T'$, defined here as the number of revolutions of the inner member 10, per revolution of the point of tangency (sliding member 16) is—$(P_2/P_1-1)$. The first minus sign is needed to indicate the opposite senses of revolution of the point of tangency and the inner member 10. The "−1" term results from the observation that with each traversal of the inner member 10 about the inner surface of the stationary member 14, the curved path of traversal causes the point of tangency to travel in one complete revolution with respect to the center of the rotating member 10. The expression is preferably written as $T'=1-P_2/P_1$.

Thus it is apparent that with respect to the rotary motion of the sliding pressure member 16, the rotary motion of the inner member 10 may be reversed in sense and "geared down" or "geared up" depending upon the ratio of the perimeters of the stationary member 14 and the inner member 10.

In the example of dimensions given in connection with FIG. 1 $P_2$ was taken as $1.1 \cdot P_1$. The turns ratio $T'$ is −1/10; that is, for every ten counterclockwise turns of the sliding member 16, there results one clockwise turn of the inner member 10.

Figure 3:
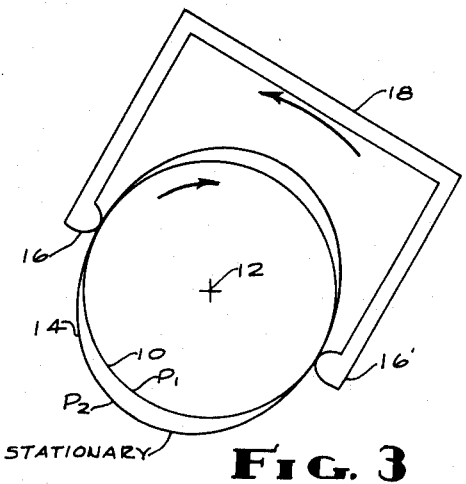

In FIG. 3 a schematic mechanization of a system utilizing this action is illustrated. A pair of diametrically disposed sliding pressure members 16, 16' are shown affixed to a frame 18 which is adapted to rotate coaxially with the inner member 10 about the latter's center 12. The rotationally stationary deformable member 14 is disposed about the inner member 10 and the sliding members 16, 16'.

When shafts, not shown, are adapted to rotate about the same axis (12) and are coupled respectively to the frame 18 and the inner member 10, the rotary control action described may be utilized as desired.

Figure 4:
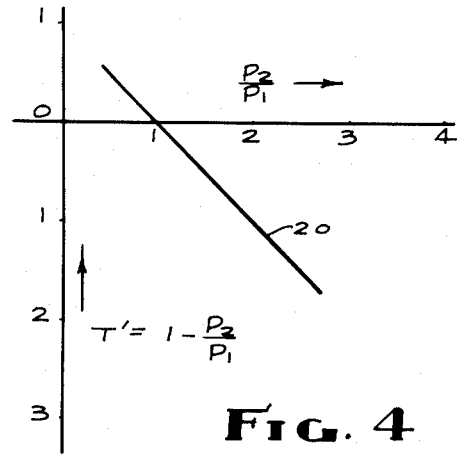
FIG. 4 is a graph, plotting on the ordinate the turns ratio of two shafts, coupled in accordance with the present invention, as a function of the ratio of their perimeters, on the abscissa.

Referring to FIG. 4 a graph of the expression $T'=1-P_2/P_1$ as a function of $P_2/P_1$ is illustrated in which the former is plotted along the ordinate while the latter is plotted along the abscissa. It is noted that for values of $P_2/P_1$ greater than unity, $T'$ is negative, indicating the sense reversal mentioned above.

Points along the straight line curve 20 of particular interest are: at $P_2/P_1$ equals 2 where the turns ratio is 1 to −1; at $P_2/P_1$ greater than 2 where the inner shaft (member 10) would be "geared up" in a reverse sense; the region of $P_2/P_1$ between 1 and 2 where the inner shaft is "geared down" and reversed; and at the point $P_2/P_1$ equals 1 where the turns ratio $T'$ equals zero which physically is the case where the inner member 10 has no clearance for rotating within the outer stationary member 14 so that regardless of the number of turns of the frame 18 the inner shaft remains motionless.

Figure 5:
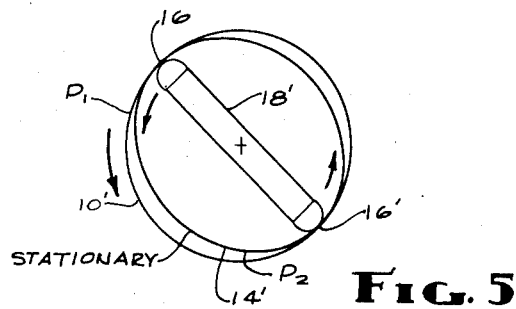
FIG. 5 is a diagram similar in purpose to those of FIG. 1–FIG. 3.

Referring to that portion of the curve 20 which lies in the first quadrant where $P_2/P_1$ is less than 1 and $T'$ is positive, $P_2$ must be smaller than $P_1$ as in the example of the invention illustrated in FIG. 5. In that figure the rotating shaft 10' has the form of a hollow outer cylinder with an inner perimeter of $P_1$ while the flexible member 14' has a smaller perimeter $P_2$ and lies within the shaft 10'. A frame 18' carries a pair of diametrically opposed sliding pressure members 16, 16' which bear outwardly in a deforming relationship against the rotationally stationary member 14'.

In operation when the frame 18' is rotated about the center of the shaft 10' as shown by the arrows, it may be seen that the outer shaft 10' is caused to rotate in the same sense of direction, but at a "geared down" rate; since for non-negative values of $P_2$ and $P_1$, $T'$ cannot reach the value of +1.

Again, utilization shafts, not shown, may be coupled to the frame 18' and to the outer shaft 10'.

Figure 6:
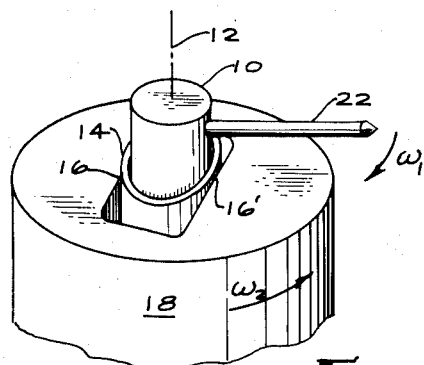
FIG. 6 is a mechanically schematic view of a simplified representation of a structural example of the invention.

Referring to FIG. 6 an elementary mechanization of the invention is illustrated. Although the example is simplified it is nevertheless adaptable to practical utilizations particularly where miniaturization is desirable. Because the structure shown is intended as an illustrated mechanization of the earlier schematic figures, particularly of FIG. 3, the reference numerals of FIG. 3 will be applied to their analogous structural counterparts represented in FIG. 6; an inner, responding shaft 10 having an outer perimeter $P_1$ corresponds to the inner circular member 10 of the earlier figures; a hollow Teflon sleeve 14 having an inner perimeter of $P_2$ represents the outer stationary member 14 of FIG. 3; and an outer slotted cylindrical member 18 having a central parallelepiped relieved therethrough with opposing broad walls 16, 16' represents the frame 18 with its diametrically opposed, sliding pressure members 16, 16' of FIG. 3.

In operation the Teflon sleeve 14 is held against rotation; and the outer member 18 is revolved counterclockwise at an angular velocity, of $\omega_2$. A utilization arm 22 affixed to and extending radially outwardly from the inner shaft member 10 is consequently caused to rotate at an angular velocity $\omega_1$ in the opposite direction as determined by the expression for $T'$ which is by definition equivalent to the relationship between the angular velocities $\omega_1$, $\omega_2$.

Figure 7:
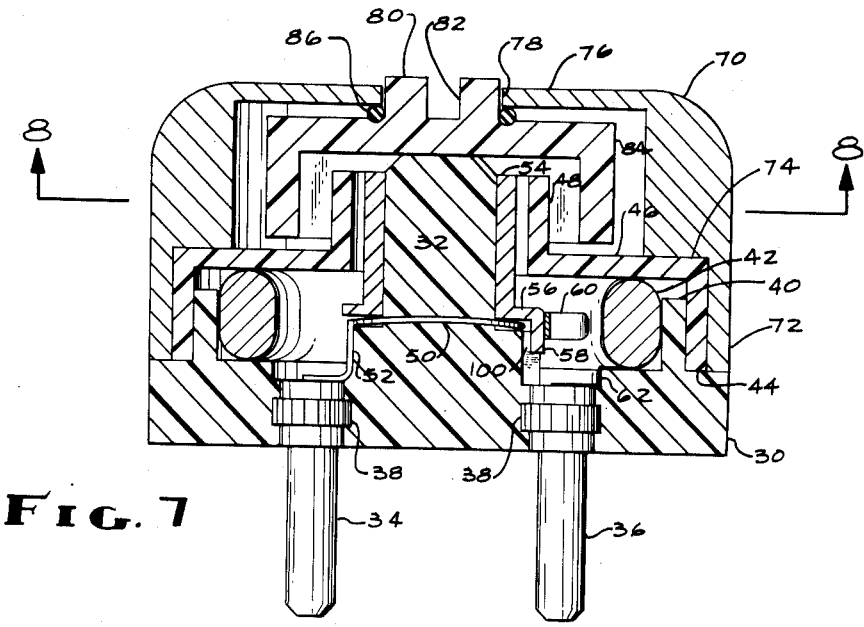
FIG. 7 is an axially sectioned view of a multi-turn miniature potentiometer constructed in accordance with the principles of the present invention.

Referring to FIG. 7 a detailed sectional view of a constructed example of the invention is illustrated. In the figure a non-conductive circular wafer-like base member 30 is illustrated having a central post 32 extending upwardly therefrom and a plurality of conductive pin members 34, 36 extending downwardly therefrom for purposes of electrical connection of the unit to a circuit board or other component. The dimensions of the base member 30 and the size and orientation of the electrically conductive pin members 34, 36 may be preferably chosen, for this example, to be similar to those of a conventional transistor base, in which case the overall diameter of the base member 30 is less than ½ inch. The top surface of each of the pin members 34, 36 is in this example substantially coplanar with the upper surface of the base member 30. The conductive pin members 34, 36 are preferably placed in the base member 30 during the molding process of the latter so that the enlarged diameter gripping ferrules 38 will hold the pin members firmly in place with respect to rotational or longitudinal displacement, with respect to the molded base member 30.

Near the outer periphery of the base member 30 and disposed concentrically with respect thereto is a raised rim member 40, the inner cylindrical surface of which in cooperation with the upper surface of the base member 30 forms a retaining shoulder for a toroidal resistance element 42. The outer cylindrical surface of the rim 40 forms in cooperation with a portion of the upper surface of the base member 30 lying radially outside of the rim 40, a retaining shoulder for a downwardly extending rim 44 of a Teflon disc 46. The rim 44 of the Teflon disc 46 is held secure against circumferential slipping with respect to the rim 40 of the base member by radial compression or cement or both. An inner rim 48 extends upwardly from the Teflon disc member 46 and has an inner periphery $P_2$. The Teflon disc 46 may be placed contiguously to or in contact with the upper surface of the toroidal resistance element 42.

Disposed over the central post 32 is a slip-ring conductor 50 which includes a radially extending finger portion 52, the outer end of which is disposed in electrical contact with the top surface of the conductive pin member 34. Also disposed over the central post 32 is an inner hollow shaft 54 which in this example is formed of metal and has a corrugated or serrated outer cylindrical surface with an effective perimeter of $P_1$. The lower cylindrical end of the hollow shaft 54 is terminated in a flange 56 which makes constant electrical connection with the slip-ring conductor 50 and which includes an outwardly extending bracket 58 which supports a conductive wiper arm 60, which makes sliding electrical contact with the inner toroidal surface of the resistance element 42. A strip conductor 62 connects one end of the resistance element 42 to the top of the conductive pin member 36, thereby completing the electrical circuit from one pin member through the resistance element, or a portion thereof, through the wiper arm 60, through the flange 56, through the slip-ring conductor 50 to the other pin member 34.

A cap member 70 having a downwardly extending rim portion 72 and a cooperating shoulder 74 is fitted snugly over the outer portions of the Teflon disc 46 as shown. The upper, base portion 76 of the cap member 70 is centrally relieved to form a circular opening 78 to provide centering for and access to an outer rotary member 80. The member 80 is substantially in the form of a short circular cylinder having a reduced diameter upper portion 82 extending through the circular opening 78 and provided with turn control means such as a screwdriver slot 82 as shown. The larger diameter portion 84 is internally relieved to form in this example a substantially rectangular parallelapiped opening, the two broad sides of which at their center point compress the upwardly extending Teflon rim 48 into non-slipping contact with the outer surface of the hollow shaft 54, see FIG. 8. Interposed compressively, in a manner to seal hermetically the entire assembly, between the upper, base portion 76 of the cap member 70 and the upper portion of the larger diameter portion 84 of the outer rotary member 80 is an O-ring 86. Thusly the entire insulated miniature potentiometer package is hermetically sealed against moisture, dust, or other deleterious foreign objects while still permitting in a miniature package, an externally rotatable wiper arm.

Figure 8:
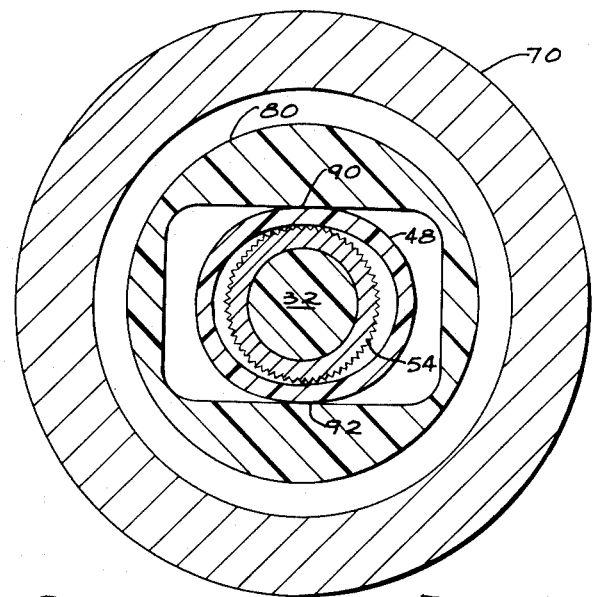
FIG. 8 is a cross sectional view of the structure of FIG. 7 taken along the lines 8—8 thereof.

Referring to FIG. 8 a sectional view is presented of the upper portions of the assembly of FIG. 7. In this view the rotational relationships of the shafts of the invention are shown and may be herefrom readily referenced to the earlier schematic figures. The inner post 32 is shown as a rotational support for the inner hollow shaft 54 with its outer serrated or corrugated surface, the roughness shown here being highly exaggerated, with an effective perimeter of $P_1$. The rotationally stationary Teflon rim 84 is shown pressed into non-slipping contact with the outer surface of the hollow shaft 54 by a pair of diametrically opposed contacting surfaces 90, 92 on the outer rotary member 80. In this manner, when the outer rotary member 80 is rotated clockwise, it slides readily around the outer surface of the Teflon rim 84. The inner surface of the rim 84 however is held in non-sliding contact with the serrated outer surface of the hollow shaft 54 so that as explained previously, the inner shaft will be rotated counterclockwise. In this view of the structure it is apparent that the turns ratio may be very versatilly selected by changing only the circumference of the rim 84; that is, so long as the annular thickness of the rim 84 remains constant, the rectangular opening in the outer rotary member 80 permits a very wide range of turns ratios to be selected by simply choosing the desired diameter or perimeter of the rim 48. Surrounding the inner assembly of the unit in this view is shown the cap member 70 in section.

Figure 9:
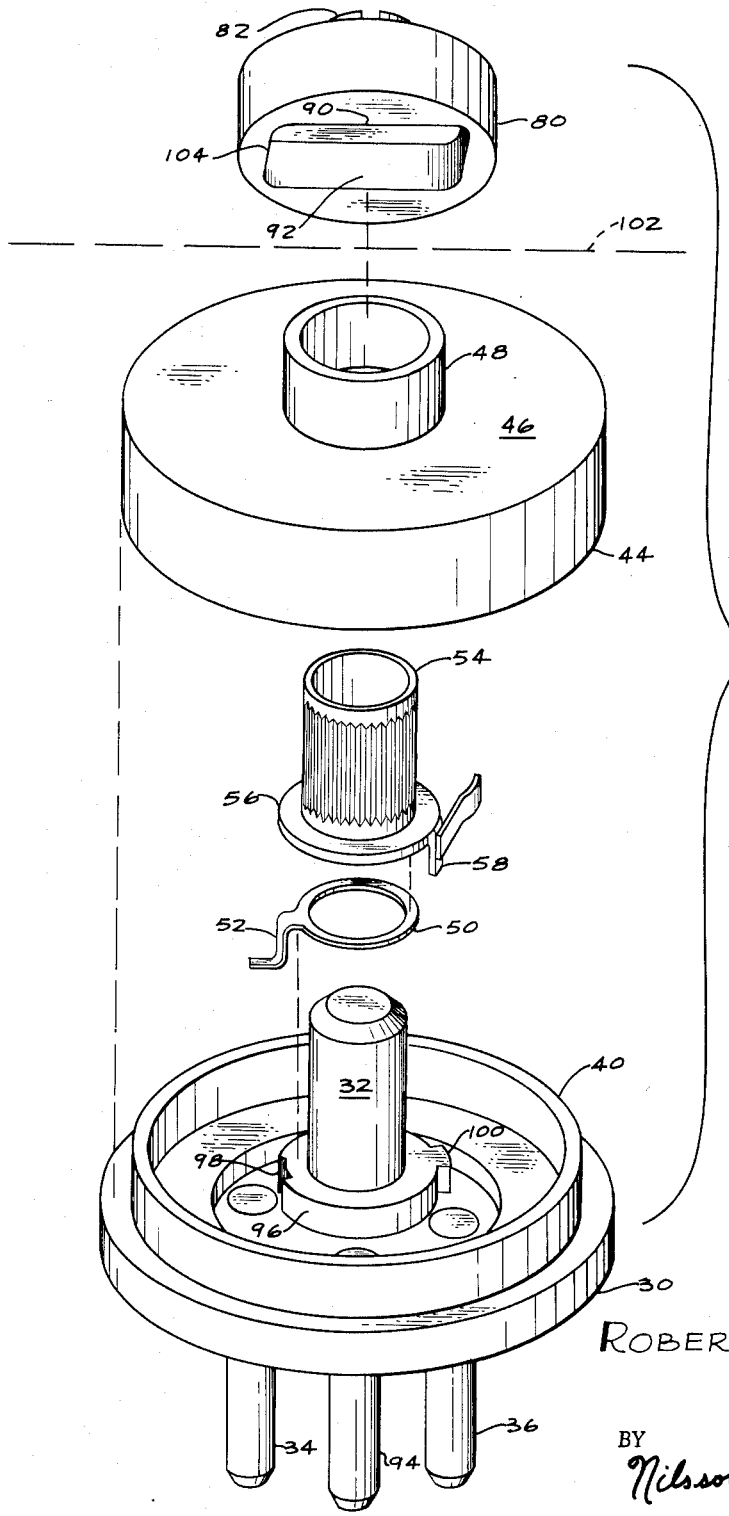
FIG. 9 is an exploded view of a portion of the structure of FIG. 7 and FIG. 8.

Referring to FIG. 9 a portion of the example of the invention illustrated in FIG. 7 and FIG. 8 is shown in exploded presentation to show more clearly the assembled relationship of the principal rotary components thereof. The circular base member 30 is presented at an angle to show the retaining shoulders formed at either side of the upwardly extending rim 40 for retaining the toroidal resistance element, not shown, and the Teflon disc 46 by its downwardly extending outer rim 44. The conductive pin members 34, 36 are seen to surface substantially coplanarly with the upper surface of the inner portion of the base member 30 and a third similar pin member 94 is shown for providing electrical contact to a second end of the toroidal resistance element, not shown.

The central post 32 is shown more clearly in this view to have an enlarged diameter lower portion 96 which forms a shoulder upon which the slip-ring conductor 50 is disposed. An axial slot 98 is provided in this base portion for positioning the slip-ring conductor 50 against rotational movement and to ensure that the extension, finger portion 52, remains in an angular position such that its end is in contact with the top surface of the conductive pin member 34. A radial extension 100 is also provided in this example integrally with the enlarged portion 96 of the central post 32 as a rotary stop for the bracket 58 extension of the flange 56 of the inner hollow shaft 54. The outer serrated or knurled surface of the inner hollow conductor 54 is illustrated particularly clearly, albeit with exaggerated depth of serration, in this view. The axial and radial positioning relationships between that member and the upwardly extending inner rim 48 of the Teflon disc 46 are also shown.

The outer rotary member 80 is illustrated, as indicated, by the dotted line 102, at a different angle of perspective with respect to the other components of the figure in order to illustrate as clearly as possible the nature of the rectangular parallelapiped recess 104 in the lower surface thereof. With reference also to FIG. 8 the compressive contact points for the rim 48 on the opposing broad walls of the recess 104 are indicated at 90 and 92. The screwdriver slot 82 for rotary actuation of the outer rotary member 80 is shown projecting above the enlarged diameter portion of the outer rotary member 80.

There have thus been disclosed a number of examples of the structural and method features of the present invention which achieve the objects and exhibit the advantages discussed hereinabove. It is stressed again, however, that the details shown are by way of example only and are not intended as a limitation upon the scope of the invention. For example the Teflon disc 46 of FIG. 9 is described as such because it is a readily, accurately machinable self-lubricating, flexible, durable substance. Other materials having similar properties or otherwise suiting the needs and purposes of the artisan may obviously be selected and utilized without departing from the spirit and scope of the invention.

What is claimed is:

1. A miniature multiturn potentiometer comprising: a circular non-conductive base member including a plurality of conductive pins extending therethrough and downwardly therefrom, a central post extending upwardly therefrom, an annular rim disposed coaxially about said post and forming with its inner cylindrical surface a resistance element retaining shoulder; an inner hollow shaft member having an effective outer perimeter $P_1$ disposed contiguously over said post in rotatable relationship therewith; resistance element wiper arm means carried by said hollow shaft; a deformable disc member having an inner rim portion extending upwardly therefrom about said hollow shaft, the length of the inner periphery of said inner rim portion being $P_2$; means for securing said disc member in non-slipping contact with said base; and a substantially disc-shaped outer rotary member being relieved from the central portion of its lower surface to define a recess disposed about said inner rim portion of said disc member and said inner shaft, said recess having a pair of surface areas, contacting in a slidable relation, said inner rim portion at diametrically opposed points on the outer cylindrical surface thereof and causing corresponding pair of inner points thereof to be urged into non-slipping contact with said inner shaft, whereby the concentric relative rotation between said inner shaft and said outer rotary member is related as 1 minus $P_2/P_1$.

2. A miniature multiturn potentiometer comprising: a circular non-conductive base member including a plurality of conductive pins extending therethrough and downwardly therefrom, a central post extending upwardly therefrom, an annular rim disposed coaxially about said post and forming with its inner cylindrical surface a resistance element retaining shoulder; a toroidal resistance element disposed concentrically on said base and said inner cylindrical surface of said annular rim; connective means for coupling at least one of said conductive pins to said resistance element; an inner hollow shaft member having an effective outer perimeter $P_1$ disposed contiguously over said post in rotatable relationship therewith; wiper arm means carried by said hollow shaft for contacting said resistance element; a semi-rigid disc member having an inner rim portion extending upwardly therefrom about said hollow shaft, the length of the inner periphery of said inner rim portion being $P_2$; means for securing said disc member in a non-rotating relationship with respect to said base member; and a substantially disc-shaped outer rotary member disposed over said inner rim portion and being relieved from the central portion of its lower surface to define a recess for said inner rim portion of said disc member and said inner shaft, said recess having a pair of surface areas contacting in a slidable relation said inner rim portion at diametrically opposed points on the outer cylindrical surface thereof and causing the corresponding inner points to be urged into non-slipping contact with said inner shaft, whereby the concentric relative rotation between said inner shaft and said outer rotary member is related to 1 minus $P_2/P_1$.

3. A miniature multiturn hermetically sealed potentiometer comprising: a circular non-conductive molded base member including a plurality of conductive pins extending therethrough and downwardly therefrom, a central post extending upwardly therefrom, an annular rim disposed coaxially about said post and forming, with its inner cylindrical surface, a resistance element retaining shoulder and forming with its outer cylindrical surface, in cooperation with an annular portion of said base member disposed radially outwardly from said annular rim an outer retaining shoulder; a toroidal resistance element disposed concentrically on said base and said inner cylindrical surface of said annular rim; connective means for coupling at least one of said conductive pins to said resistance element; a slip-ring conductor disposed on said base member contiguously about at least a portion of the periphery of said post and including a radially extending portion disposed in contact with one of said conductive pins; an inner hollow shaft member having an effective outer perimeter $P_1$ disposed contiguously over said post in rotatable relationship therewith adjacently to said slip-ring conductor; wiper arm means carried by said hollow shaft for contacting said resistance element and said slip-ring conductor; a Teflon disc member having an outer rim portion extending downwardly over said annular rim of said base member in non-slipping cylindrical contact therewith and an inner rim portion extending upwardly therefrom about said hollow shaft, the length of the inner periphery of said inner rim portion being $P_2$; a cup-shaped cap member disposed with its rim downwardly over said outer rim portion of said Teflon disc member and in contact with said outwardly disposed annular portion of said base member whereby said outer rim portion of said Teflon disc is concentrically disposed non-rotatingly between said cap member rim and said annular rim of said base member, the upper, base portion of said cap member being relieved to define a central opening therein; a substantially disc-shaped outer rotary member disposed within said cap member and having an upper surface in communication with said central opening and being relieved from the central portion of its lower surface to define a recess for said inner rim portion of said Teflon disc member and said inner shaft, said recess having a pair of surface areas contacting in a slidable relation said inner rim portion at diametrically opposed points on the outer cylindrical surface thereof and causing the corresponding inner points to be urged into non-slipping contact with said inner shaft; and an O-ring sealing member disposed about said central opening compressively between said outer rotary member and said cap member, whereby the concentric relative rotation between said inner shaft and said outer rotary member is related as 1 minus $P_2/P_1$.

References Cited by the Examiner

Harmonic Drive-Principles and Performance, Copyright, 1959 by United Shoe Machinery Corporation, Received in U.S. Patent Office Dec. 7, 1959, copy available in 74–640.

DON A. WHITE, *Primary Examiner.*